Patented Apr. 19, 1932

1,854,525

UNITED STATES PATENT OFFICE

LUDWIG ROSENSTEIN, OF SAN FRANCISCO, CALIFORNIA, ASSIGNOR TO SHELL DEVELOPMENT COMPANY, OF SAN FRANCISCO, CALIFORNIA, A CORPORATION OF DELAWARE

TERTIARY XANTHATES

No Drawing. Application filed November 11, 1929. Serial No. 406,513.

My invention relates to certain new xanthates of tertiary alcohol. These xanthates are useful as in flotation processes, for insecticides and as vulcanizing accelerators.

It is the object of my invention to provide certain xanthates of tertiary alcohols which have not heretofore been available.

In the literature will be found descriptions of several processes for producing the xanthates of primary alcohols. However, the production of xanthates of tertiary alcohols has not been effected since the previously known processes are not suitable for their production. In accordance with my invention I have produced certain xanthates of tertiary mono-hydric alcohols such as tertiary butyl alcohol.

In the following specification I shall point out the manner of forming the tertiary alcohol xanthates. It is to be understood that the invention, as defined by the claims, is to be accorded a range of equivalents consistent with the state of the prior art.

In forming the potassium xanthate of tertiary butyl alcohol I have preferably proceeded by first grinding potassium hydroxide to a fine powder. The hydroxide was then added to the tertiary butyl alcohol in substantially molecular proportions. A molecular quantity of carbon disulphide was then added and the mixture was heated under a reflux condenser at about the boiling point of the mixture. The heating is preferably continued for some little time to insure that a reasonable amount of the potassium tertiary butyl xanthate is formed. As the reaction proceeds the white alcoholate changes to the yellow xanthate which may be separated out by filtering when the heating is discontinued. This xanthate I have found upon analysis to be potassium tertiary butyl xanthate.

In forming the sodium xanthate of the tertiary butyl alcohol I have found that the alcohol is preferably first contacted with finely divided metallic sodium. After the sodium had reacted with the alcohol, carbon disulphide in substantially molecular proportions was added, whereupon the sodium alcoholate was transformed into the sodium xanthate. This xanthate was found upon analysis to be sodium tertiary butyl xanthate.

I claim:

1. As a new compound: an alkali-metal xanthate of a tertiary monohydric aliphatic alcohol.
2. As a new compound: an alkali-metal xanthate of tertiary butyl alcohol.
3. As a new compound: the sodium xanthate of a tertiary monohydric aliphatic alcohol.
4. As a new compound: sodium tertiary butyl xanthate.
5. As a new compound: potassium tertiary butyl xanthate.
6. As a new compound: the potassium xanthate of a tertiary monohydric aliphatic alcohol.

In testimony whereof, I have hereunto set my hand.

LUDWIG ROSENSTEIN.